_United States Patent_ [19]

Smith

[11] Patent Number: 4,706,754

[45] Date of Patent: Nov. 17, 1987

[54] OIL RECOVERY PROCESS USING A DELAYED POLYMER GEL

[75] Inventor: Ronald E. Smith, Littleton, Colo.

[73] Assignee: Marathon Oil Company, Findlay, Ohio

[21] Appl. No.: 840,122

[22] Filed: Mar. 14, 1986

[51] Int. Cl.$^4$ .......................................... E21B 33/138
[52] U.S. Cl. .................................. 166/295; 166/300; 523/130
[58] Field of Search ............... 166/295, 294, 300, 270; 523/130

[56] References Cited

U.S. PATENT DOCUMENTS

| | | | |
|---|---|---|---|
| 3,306,870 | 2/1967 | Eilers et al. | 166/295 X |
| 3,762,476 | 10/1973 | Gall | 166/294 |
| 3,926,258 | 12/1975 | Hessert et al. | 166/295 X |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,147,211 | 4/1979 | Sandiford | 166/294 X |
| 4,343,363 | 8/1982 | Norton et al. | 166/300 X |
| 4,460,751 | 7/1984 | Hanlon et al. | 166/300 X |
| 4,524,829 | 6/1985 | Hanlon et al. | 166/295 X |
| 4,552,217 | 11/1985 | Wu et al. | 166/295 X |
| 4,606,772 | 8/1986 | Almond et al. | 166/294 X |
| 4,644,073 | 2/1987 | Mumallah et al. | 252/8.554 X |

OTHER PUBLICATIONS

Middleman, S., *The Flow of High Polymers*, Interscience Publishers, N.Y., 1968, pp. 68–70.

*Primary Examiner*—George A. Suchfield
*Attorney, Agent, or Firm*—Jack L. Hummel; Rodney F. Brown

[57] ABSTRACT

A process for reducing the permeability of a high permeability region in a subterranean hydrocarbon-bearing formation by preparing an aqueous gelation solution at the surface comprised of a water-soluble polymer, a metal carboxylate crosslinking agent and a carboxylic acid delaying agent. The delaying agent substantially delays gelation of the solution until it is injected and in place in the desired treatment region.

28 Claims, No Drawings

OIL RECOVERY PROCESS USING A DELAYED POLYMER GEL

DESCRIPTION

BACKGROUND OF THE INVENTION

1. Technical Field

The invention relates to an oil recovery process and more particularly a process for reducing the permeability in a relatively high permeability region of a subterranean hydrocarbon-bearing formation.

2. Description of Related Art

Poor vertical conformance results from the vertical juxtaposition of relatively high permeability geologic regions to relatively low permeability regions within a subterranean formation. Poor areal conformance results from the presence of high permeability streaks and high permeability anomalies within the formation matrix, such as vertical fractures and networks of the same, which have very high permeability relative to the formation matrix. Fluids generally exhibit poor flow profiles and sweep efficiencies in subterranean formations having poor vertical or areal conformance. Poor conformance is particularly a problem where vertical heterogeneity and/or fracture networks or other structural anomalies are in fluid communication with a subterranean wellbore across which fluids are injected or produced.

A number of attempts to remedy conformance problems exist. U.S. Pat. Nos. 3,762,476; 3,981,363; 4,018,286; and 4,039,029 to Gall or Gall et al describe various processes wherein gel compositions are formed in high permeability regions of subterranean formations to reduce the permeability therein. According to U.S. Pat. No. 3,762,476, a polymer such as polyacrylamide is injected into a formation followed sequentially by a crosslinking agent. The sequentially injected slugs are believed to permeate the treatment region of the formation and gel in situ.

It is generally held that effective polymer/crosslinking agent systems necessitate sequential injection of the gel components because gel systems mixed on the surface often set up before they can effectively penetrate the treatment region. However, in practice, treatments such as that disclosed in U.S. Pat. No. 3,762,476 using sequentially injected gel systems have proven unsatisfactory because of the inability to achieve complete mixing and gelation in the formation. As a result, gels only form at the interface of the unmixed gel components and often in regions remote from the desired treatment region. A need exists for a gelation process wherein the gelation solution substantially penetrates the desired treatment region of a subterranean hydrocarbon-bearing formation before setting up.

SUMMARY OF THE INVENTION

The present invention provides a process for improving oil recovery from a subterranean hydrocarbon-bearing formation penetrated by a production and/or injection well. The process improves vertical and areal conformance in the formation and correspondingly improves flow profiles and sweep efficiencies of injected and/or produced fluids in the formation. These objectives and others are achieved by an in situ polymer gelation process employing a gelation delaying agent.

The process comprises preparing an aqueous gelation solution above ground containing a high molecular weight water-soluble polymer, a metal carboxylate crosslinking agent, and a carboxylic acid delaying agent. The solution is injected into the desired treatment region via a wellbore in fluid communication therewith. The delaying agent advantageously inhibits complete gelation of the solution until the solution has propagated into the treatment region. Once in the treatment region the gelation solution sets up as a continuous single-phase gel composition comprised of the polymer and crosslinking agent which substantially reduces permeability therein.

After the gelation treatment, fluids may be injected into or produced from the hydrocarbon-bearing regions of the formation in fluid communication with the wellbore. The gel is substantially incapable of flowing from the treatment region and is substantially permanent and resistant to in situ degradation.

The process provides distinct advantages over gelation processes known in the art. The practitioner of the present invention can fully prepare the gelation solution at the surface under controlled conditions, yet delay substantially complete gelation of the solution until it is in place in the desired subterranean treatment region. The resultant gel has sufficient strength and stability to meet the demands of the treatment region.

DESCRIPTION OF PREFERRED EMBODIMENTS

According to the present invention, the aqueous gelation solution is prepared by admixing a crosslinkable polymer, a metal carboxylate crosslinking agent and a gelation delaying agent in an aqueous solvent at the surface. The polymer may be substantially any high molecular weight crosslinkable biopolymer or synthetic polymer. Useful synthetic polymers include acrylamide polymers, i.e., polymers containing one or more acrylamide groups, such as polyacrylamide or partially hydrolyzed polyacrylamide. The average weight of the polymer used herein is in the range of about 10,000 to about 50,000,000, preferably about 100,000 to about 20,000,000, and most preferably about 200,000 to about 12,000,000. The polymer concentration in the gelation solution may be about 1,000 ppm up to the solubility limit of the polymer in the solvent or the rheological constraints of the solution.

The metal carboxylate crosslinking agent is derived from a carboxylate compound or mixture thereof. In solution, the crosslinking agent comprises electronegative carboxylate species which may include one or more of the following water-soluble species: formate, acetate, propionate, lactate, lower substituted derivatives thereof, and mixtures thereof. In addition to electronegative carboxylate species, the solution is further comprised of electropositive metallic species, such as $Ca^{2+}$, $Mg^{2+}$, $Ba^{2+}$, $Al^{3+}$, $Fe^{3+}$, $Ti^{4+}$, $Zn^{2+}$, $Sn^{4+}$, $Cr^{3+}$, etc. The weight ratio of polymer to crosslinking agent is advantageously about 1:1 to about 500:1.

The delaying agent is a carboxylic acid, and preferably a low molecular weight mono-basic carboxylic acid, such as formic, acetic, propionic, lactic acid, or mixtures thereof. The delaying agent is advantageously added to either the polymer or crosslinking agent before they are admixed. Preferably the delaying agent is admixed with the crosslinking agent, followed by the addition of the polymer to form a bulk gelation solution at the surface suitable for injection. Alternatively, though less preferred, the polymer, crosslinking agent, and delaying agent can all be simultaneously mixed at or near the wellhead by in-line mixing means during injection.

The aqueous solvent of the gelation solution may be fresh water or a brine having a total dissolved solids concentration up to the solubility limit of the solids in water. Inert fillers such as crushed or naturally fine rock material or glass beads can also be added to the gelation solution to reinforce the gel network structure.

The present process enables the practitioner to predetermine the gelation rate of a gel for a given application as a function of the delaying agent concentration. The gelation rate is defined as the degree of gel formation as a function of time or, synonylmously, the rate of cross-linking in the gelation solution. The degree of crosslinking may be quantified in terms of gel viscosity and/or elasticity, such as storage and loss moduli. These terms are defined in Middleman, S., *The Flow of High Polymers*, Interscience Publishers, N.Y., 1968, at pp. 68–70.

The delaying agent advantageously enables the practitioner to create a gelation solution having a nonlinear gelation rate. The initial rate is sufficiently slow to substantially delay gelation of the solution until it has been prepared at the surface, injected into the wellbore, and displaced into the desired treatment region. Once in place in the desired treatment region, the gelation rate of the solution advantageously accelerates to achieve substantially complete gelation of the solution relatively rapidly.

The present process is particularly applicable to cases where it is extremely difficult to prepare a polymer/metal carboxylate gelation solution having a favorable gelation rate under formation conditions. For example, high formation temperatures, i.e., substantially greater than 38° C. at the depth of the treatment region, can cause premature gelation of a polymer/metal carboxylate gelation solution in the wellbore and subsequent undesired plugging of portions of the formation or wellbore face. By incorporating a predetermined amount of a delaying agent in the gelation solution, gelation can be delayed to a sufficient degree which enables the solution to be placed in a high temperature treatment region while the gel is still mobile.

The concentration of the delaying agent admixed in the gelation solution is generally in the range of about 0.05 to about 10% by weight, preferably about 0.1 to about 5.0% by weight and most preferably about 0.5 to about 2.0% by weight depending on the concentration of the gel components, the reaction temperature and the desired gelation time. The concentration of the delaying agent in the gelation solution is adjusted within the given range such that the gelation reaction proceeds extremely slowly for a relatively long initial time period, during which very little gelation occurs. At the end of the initial period, the rate of the gelation reaction substantially accelerates, causing substantially complete gelation to occur very rapidly thereafter. Gelation can generally be substantially delayed up to about 24 hours or more from the time the gelation solution is formulated and injected using the present process. Even under extremely unfavorable in situ conditions, gelation can be delayed at least 1 to 12 hours or more and preferably at least 6 to 12 hours by careful formulation of the gel.

The present gelation mechanism enables the practitioner to design a gelation solution which can be injected into a formation at a desired injection rate with little resistance to injectivity caused by premature gelation. Yet, the process is designed to gel the solution very rapidly after it is all in place in the desired treatment region. This minimizes lost production from shut in of injection and/or production wells.

The process is applicable to conformance treatment of formations under most conditions and is specific to treating regions within the formation which are in fluid communication with an injection or production well. The process is applicable to the treatment of anomalies such as streaks of relatively high permeability, fractures or fracture networks in direct communication via the anomaly with an injection or production well and is further applicable to the treatment of selected high permeability zones of the matrix.

The following examples demonstrate the practice and utility of the present invention but are not to be construed as limiting the scope thereof.

EXAMPLE 1

A series of gelation solutions are prepared by first mixing glacial acetic acid with an aqueous 2% by weight unhydrolyzed polyacrylamide solution having a molecular weight of 11,000,000. This mixture is combined with a 50% by weight chromium acetate solution resulting in a gelation solution having a weight ratio of 20:1 polyacrylamide to chromium acetate. The solution is gelled at a temperature of 60° C. and a pressure of 3,500 kPa. The gelation rate is determined by measuring the storage modulus, $G'$, of the solution with a rheometer. Increasing values of $G'$ indicate an increasing degree of gel formation.

A series of runs are performed using gelation solutions having differing concentrations of the delaying agent, acetic acid. The results tabulated in Tables 1–4 show the gelation rate as a function of the acetic acid concentration. The units are consistent throughout Tables 1–8.

TABLE 1

| Acetic Acid Concentration (wt % of Total Gelation Solution) | Gelation Solution pH | Time (Min.) | $G'$ (dynes/cm$^2$) |
|---|---|---|---|
| 0 | 8.3 | 30 | 1500 |
| | | 60 | 2250 |
| | | 90 | 2700 |
| | | 120 | 2900 |
| | | 150 | 3000 |
| | | 180 | 3120 |
| | | 210 | 3200 |
| | | 240 | 3250 |
| | | 270 | 3280 |
| | | 300 | 3300 |
| | | 330 | 3320 |
| | | 360 | 3350 |
| | | 480 | 3380 |
| | | 600 | 3400 |
| | | 1200 | 3400 |

TABLE 2

| Acetic Acid Concentration | Gelation Solution pH | Time | $G'$ |
|---|---|---|---|
| 0.1 | 5.0 | 30 | 250 |
| | | 60 | 800 |
| | | 90 | 1200 |
| | | 120 | 1400 |
| | | 150 | 1550 |
| | | 180 | 1700 |
| | | 210 | 1800 |
| | | 240 | 1900 |
| | | 270 | 1950 |
| | | 300 | 2050 |
| | | 330 | 2100 |

TABLE 2-continued

| Acetic Acid Concentration | Gelation Solution pH | Time | G' |
|---|---|---|---|
|  |  | 360 | 2150 |
|  |  | 480 | 2300 |
|  |  | 600 | 2350 |
|  |  | 1200 | 2250 |

TABLE 3

| Acetic Acid Concentration | Gelation Solution pH | Time | G' |
|---|---|---|---|
| 0.5 | 4.2 | 30 | 100 |
|  |  | 60 | 200 |
|  |  | 90 | 240 |
|  |  | 120 | 300 |
|  |  | 180 | 400 |
|  |  | 240 | 500 |
|  |  | 360 | 600 |
|  |  | 480 | 700 |
|  |  | 600 | 800 |
|  |  | 720 | 900 |
|  |  | 780 | 1000 |
|  |  | 840 | 1300 |
|  |  | 1200 | 1300 |

TABLE 4

| Acetic Acid Concentration | Gelation Solution pH | Time | G' |
|---|---|---|---|
| 1.0 | 3.9 | 30 | 100 |
|  |  | 60 | 200 |
|  |  | 90 | 240 |
|  |  | 120 | 250 |
|  |  | 180 | 270 |
|  |  | 240 | 300 |
|  |  | 360 | 350 |
|  |  | 480 | 400 |
|  |  | 540 | 420 |
|  |  | 570 | 780 |
|  |  | 600 | 1500 |
|  |  | 720 | 1800 |
|  |  | 1200 | 1800 |

EXAMPLE 2

A series of runs are performed using gelation solutions having differing concentrations of acetic acid. The solutions are prepared by mixing glacial acetic acid with a 50% chromium acetate solution. The resulting mixure is added to a 2% polyacrylamide solution having the same properties as in Example 1. The resulting gelation solution has a weight ratio of 10:1 polyacrylamide to chromium acetate. The solution is gelled at a temperature of 60° C. and a pressure of 3,500 kPa. Tables 5-8 show the gelation rate as a function of the acetic acid concentration.

TABLE 5

| Acetic Acid Concentration | Time | G' |
|---|---|---|
| 0.25 | 60 | 300 |
|  | 120 | 750 |
|  | 240 | 1200 |
|  | 360 | 1550 |
|  | 480 | 1750 |
|  | 600 | 1850 |
|  | 720 | 2000 |
|  | 960 | 2100 |
|  | 1200 | 2200 |

TABLE 6

| Acetic Acid Concentration | Time | G' |
|---|---|---|
| 0.5 | 60 | 50 |
|  | 120 | 150 |
|  | 240 | 300 |
|  | 360 | 600 |
|  | 480 | 800 |
|  | 600 | 1050 |
|  | 720 | 1200 |
|  | 960 | 1350 |
|  | 1200 | 1500 |

TABLE 7

| Acetic Acid Concentration | Time | G' |
|---|---|---|
| 0.75 | 60 | 0 |
|  | 240 | 0 |
|  | 360 | 100 |
|  | 480 | 250 |
|  | 600 | 350 |
|  | 720 | 600 |
|  | 960 | 800 |
|  | 1200 | 1000 |

TABLE 8

| Acetic Acid Concentration | Time | G' |
|---|---|---|
| 1.0 | 60 | 0 |
|  | 480 | 0 |
|  | 600 | 100 |
|  | 720 | 200 |
|  | 960 | 400 |
|  | 1200 | 600 |

The Examples indicate that the presence of acetic acid in the gelation solution substantially delays the onset of gelation as a function of increasing acetic acid concentration. When the process is performed in accordance with the conditions of Table 8, no significant gelation occurs during the first eight hours after formulation of the gelation solution. This allows the practitioner sufficient time to inject the solution into a desired treatment region.

While foregoing preferred embodiments of the invention have been described and shown, it is understood that all alternatives and modifications, such as those suggested and others, may be made thereto and follow in the scope of the invention.

I claim:

1. A process for substantially reducing the permeability of a high permeability region in a hydrocarbon-bearing formation below an earthern surface penetrated by a wellbore in fluid communication with said region, the process comprising:
   preparing an aqueous gelation solution at the surface consisting essentially of a crosslinkable polymer, a carboxylic acid, an aqueous solvent, and a complex capable of crosslinking said polymer and formed of at least one electropositive chromium III species and at least one electronegative acetate species;
   injecting said gelation solution into said formation via said wellbore;
   displacing said gelation solution into said high permeability region; and
   substantially gelling said solution in said region to substantially reduce the permeability of said region.

2. The process of claim 1 wherein said crosslinkable polymer is an acrylamide polymer.

3. The process of claim 1 wherein said carboxylic acid is selected from the group consisting of formic, acetic, propionic, lactic acid, and mixtures thereof.

4. The process of claim 1 wherein said gelation solution is prepared by mixing said polymer and carboxylic acid in solution and thereafter adding said complex thereto.

5. The process of claim 1 wherein said carboxylic acid is present in said gelation solution in sufficient concentration to substantially delay the gelling of said polymer by said complex such that said solution remains sufficiently fluid to be displaced into said high permeability region.

6. The process of claim 5 wherein said gelling is substantially delayed for at least about 1 hour from the time said solution is prepared.

7. The process of claim 1 wherein the temperature of said high permeability region is greater than about 38° C.

8. The process of claim 1 wherein said carboxylic acid is added to said solution in a concentration of about 0.05 to about 10 percent by weight based on the weight of said gelation solution.

9. The process of claim 8 wherein the pH of said gelation solution is about 2 to about 5.

10. The process of claim 1 wherein said high permeability region is a fracture in said formation.

11. The process of claim 1 wherein said high permeability region is an anomaly in said formation.

12. A process for substantially reducing the permeability of a high permeability region in a hydrocarbon-bearing formation below an earthern surface penetrated by a wellbore in fluid communication with said region, the process comprising:
 preparing an aqueous gelation solution at the surface consisting essentially of a crosslinkable polymer, a carboxylic acid, an aqueous solvent, and a complex capable of crosslinking said polymer and formed of at least one electropositive chromium III species, at least one electronegative acetate species. and at least one species selected from the group consisting of electronegative oxygen species, electronegative hydroxide species, inorganic monovalent ions, inorganic divalent ions, water molecules, and mixtures thereof;
 injecting said gelation solution into said formation via said wellbore;
 displacing said gelation solution into said high permeability region; and
 substantially gelling said solution in said high permeability region to substantially reduce the permeability of said region.

13. The process of claim 12 wherein said crosslinkable polymer is an acrylamide polymer.

14. The process of claim 12 wherein said carboxylic acid is selected from the group consisting of formic, acetic, propionic, lactic acid, and mixtures thereof.

15. The process of claim 12 wherein said gelation solution is prepared by mixing said polymer and carboxylic acid in solution and thereafter adding said complex thereto.

16. The process of claim 12 wherein said carboxylic acid is present in said gelation solution in sufficient concentration to substantially delay the gelling of said polymer by said complex such that said solution remains sufficiently fluid to be displaced into said high permeability region.

17. The process of claim 16 wherein said gelling is substantially delayed for at least about 1 hour from the time said solution is prepared.

18. The process of claim 12 wherein the temperature of said high permeability region is greater than about 38° C.

19. The process of claim 12 wherein said carboxylic acid is added to said solution in a concentration of about 0.05 to about 10 percent by weight based on the weight of said polymer.

20. The process of claim 19 wherein the pH of said gelation solution is about 2 to about 5.

21. The process of claim 12 wherein said high permeability region is a fracture in said formation.

22. The process of claim 12 wherein said high permeability region is an anomaly in said formation.

23. The process of claim 12 wherein said gelation solution is prepared by mixing said polymer, complex, and carboxylic acid in solution simultaneously.

24. The process of claim 1 wherein said gelation solution is prepared by mixing said polymer, complex, and carboxylic acid in solution simultaneously.

25. The process of claim 12 wherein said gelation solution is prepared by mixing said polymer and complex in solution and thereafter adding said carboxylic acid thereto.

26. The process of claim 1 wherein said gelation solution is prepared by mixing said polymer and complex in solution and thereafter adding said carboxylic acid thereto.

27. The process of claim 12 wherein said carboxylic acid is acetic acid.

28. The process of claim 1 wherein said carboxylic acid is acetic acid.

* * * * *

UNITED STATES PATENT AND TRADEMARK OFFICE
CERTIFICATE OF CORRECTION

PATENT NO. : 4,706,754

DATED : November 17, 1987

INVENTOR(S) : Ronald E. Smith

It is certified that error appears in the above-identified patent and that said Letters Patent is hereby corrected as shown below:

Col. 2, line 38: After "average" insert --molecular--.
Col. 3, line 13: Delete "synonylmously" and insert -- synonymously--.

Signed and Sealed this

Fifth Day of April, 1988

Attest:

DONALD J. QUIGG

Attesting Officer

Commissioner of Patents and Trademarks